UNITED STATES PATENT OFFICE.

JULIUS HERBABNY, OF OFFENBACH-ON-THE-MAIN, AND CHRISTOPH HARTMANN, OF FRANKFORT-ON-THE-MAIN, GERMANY.

GREEN-BLUE TETRAZO DYE.

SPECIFICATION forming part of Letters Patent No. 639,040, dated December 12, 1899.

Application filed September 28, 1898. Serial No. 692,074. (Specimens.)

*To all whom it may concern:*

Be it known that we, JULIUS HERBABNY, doctor of philosophy, residing at Offenbach-on-the-Main, and CHRISTOPH HARTMANN, doctor of philosophy, residing at Frankfort-on-the-Main, Germany, have invented a new Greenish-Blue Tetrazo Dyestuff, of which the following is a specification.

This invention consists in a new substantive poly-azo-coloring matter suitable for dyeing unmordanted cotton and obtainable by the reduction of the disazo dyestuff which results from the combination of a toluylene-diamin-sulfoacid, $$CH_3 : NH_2 : NH_2 : SO_3H =$$
$$(1:2:6:4); (1:2:4:5); (1:8:4:6),$$

with two molecules of para-nitro-diazo-benzenechlorid, tetrazotizing the thus-obtained tetraämido-disazo dyestuff with two molecules sodium nitrite, and finally combining with two molecules of a suitable component.

The following example illustrates the manner in which our invention may be carried out and brought into practical effect. The parts are by weight. Combine in a weakly-alkaline solution twenty-two and two-fifths (22.4) parts of toluylene-diamin-sulfoacid (sodium salt) with twenty-seven and three-fifths (27.6) parts of paranitranilin, diazotized, as usual, with thirteen and four-fifths (13.8) parts of sodium nitrite, and reduce the precipitated dyestuff with about one hundred and twenty (120) parts of sodium sulfid in an aqueous solution at about fifty to ninety degrees centigrade, (50-90° C.) The end of the reaction is recognized when the color of the mixture does not change any more. Then precipitate in the cold the product of the reduction by acids, avoiding any excess of acid, and purify by redissolving in soda, exactly neutralizing with acids. Then diazotize in hydrochloric-acid solution, while cooling, twenty-three (23) parts of the thus-obtained tetraämidodisazo body with seven (7) parts of sodium nitrite and combine the resulting reddish-brown tetrazo compound with thirty-five (35) parts of the amidonaphthol disulfo-acid H, adding as much soda as to keep alkaline the final reaction, and precipitate with common salt. The dyestuff thus obtained dyes unmordanted cotton from alkaline or neutral baths greenish blue and forms a gray-black to black powder, insoluble in alcohol, soluble in water with a pure-blue shade, which does not change on addition of soda, but turning into a bluish violet on adding acids. It is also soluble in concentrated sulfuric acid, giving a pure-blue solution, which after standing for some time or on addition of water turns into violet to reddish violet.

Now what we claim is—

As a new article of manufacture, the greenish-blue tetrazo dyestuff, obtainable by the combination of the tetraämido disazo compound derived from a toluylenediaminsulfo-acid and para-nitrodiazobenzene with amido-naphtholdisulfoacid H which has the formula

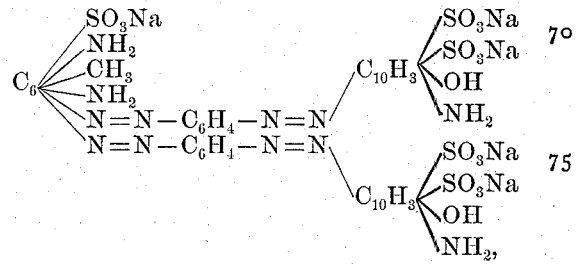

and is a grayish-black to black powder insoluble in alcohol, is soluble in water with a pure-blue shade which does not change on addition of soda but turns into a bluish violet on adding acids, is also soluble in concentrated sulfuric acid giving a pure-blue solution which after standing for some time or on addition of water turns into violet to reddish violet, and yields on unmordanted cotton in alkaline or neutral baths greenish-blue shades, fast to washing, all substantially as herein described.

In testimony whereof we have signed our names to this specification in the presence of two subscribing witnesses.

JULIUS HERBABNY.
CHRISTOPH HARTMANN.

Witnesses:
DEAN B. MASON,
JEAN GRUND.